Aug. 22, 1961 J. S. FEINER ET AL 2,997,611
ANNULAR HYSTERESIS ELECTRIC MOTOR
Filed July 2, 1956

INVENTORS
JACOB S. FEINER
ALFRED B. FREEMAN
BY Alfred B. Freeman
AGENT

United States Patent Office 2,997,611
Patented Aug. 22, 1961

2,997,611
ANNULAR HYSTERESIS ELECTRIC MOTOR
Jacob S. Feiner, 1997 Hughes Ave., Bronx, N.Y., and Alfred B. Freeman, 2602 Grand Ave., North Bergen, N.J.
Filed July 2, 1956, Ser. No. 595,323
9 Claims. (Cl. 310—164)

This invention relates to an electric motor of the type which has a magnetically retentive rotor or stator element. Such motors are normally self-starting and run synchronously. They are used in devices requiring a constant speed drive such as timing mechanisms, sound recorders, and sound record players.

The torque developed by motors of this type is due to the interaction of a rotating magnetic field with the magnetization induced and retained in the magnetically retentive element. The rotating magnetic field is usually produced either by a single-phase electric current applied to the windings of a field element having shading means associated with alternate poles or by a two-phase electric current applied to the separate windings of two field elements whose poles are arranged alternately.

This invention applies the magnetizing forces produced in the field element to the magnetically retentive element in a direction substantially perpendicular to the direction of relative movement between the field element and the retentive element. This makes possible a number of advantages over known designs in which the magnetizing forces are applied substantially parallel to the direction of relative movement.

The circumferential spacing and sizing of the field poles can be varied independently of the cross sectional dimensions normal to the flux path. It is thus possible to use the flux path dimensions which provide the best efficiency in designs both for higher power and lower speed ratings. The possible design configurations can also be more economically constructed. Another feature is a configuration that increases the effective air gap area and so increases the efficiency obtainable with a given length of air gap. Several embodiments are disclosed to illustrate some of the ways in which the invention can be used.

An object of the invention is a motor of this type which is more efficient and easier to construct than known motors of a similar type.

A further object of this invention is a motor of this type which will run efficiently at a low synchronous speed to reduce wear and the reduction gearing required for many applications.

A still further object of this invention is a motor of this type which will provide a high power output at a synchronous speed.

A yet further object of this invention is a motor of this type which can be built in a variety of shapes and sizes adapted for a variety of applications.

Other objects and advantages and a better understanding of the invention will be had by referring to the following description and claims taken in conjunction with the accompanying drawings in which:

Figure 1:
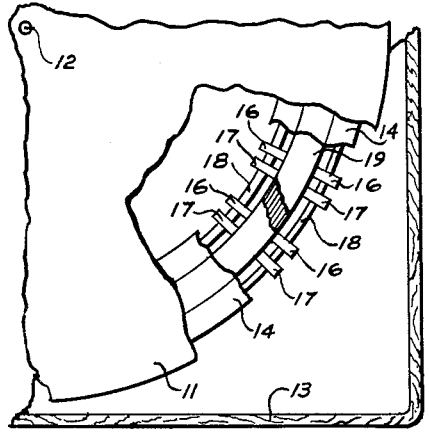
FIG. 1 is a plan view of a fragmentary portion of one embodiment of the invention in which a section of the rotor is cutaway to show a section of the stator.
Figure 2:
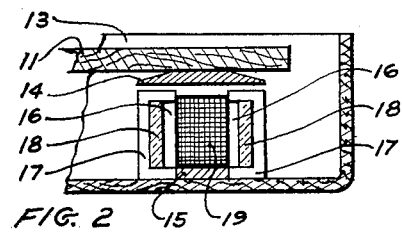
FIG. 2 is an elevation view of a vertical cross section of a portion of the stator and rotor assembly of the embodiment of FIG. 1.
Figure 3:
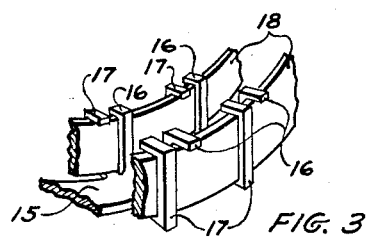
FIG. 3 is a perspective view of a fragmentary portion of the stator poles and shading rings of the embodiment of FIG. 1.

Referring now to FIG. 1, FIG. 2, and FIG. 3 which show the first embodiment, turntable 11 joins to shaft 12 which journals in bearing means (not shown) that mount on case 13. The annular disc shaped magnetically retentive element 14 attaches to the lower side of turntable 11 concentrically with shaft 12. Annular stator element 15 mounts on case 13 below retentive element 14 and has rings of poles 16 and 17 projecting upwardly from along its inner and outer edges. Shading rings 18 fit between the ring poles 16 and the ring of poles 17 at both the inner and outer edges of stator element 15. Toroidally shaped coil 19 fits between the inner and outer rings of poles 16.

The ends of upwardly projecting poles 16 and 17 are bent over radially to lie in a common horizontal plane adjacent to the lower surface of retentive element 14. The inner and outer edges of retentive element 14 are tapered over the radial dimension coextensive with the inner and outer rings of bent over portions of poles 16 and 17. Poles 16 and 17 are grouped in pairs at equally spaced circumferential positions around the inner and outer edges and each inner pair has a matching outer pair at the same circumferential position. The angle between circumferentially adjacent poles 16, or poles 17, has the same ratio to the angle between the poles 16 and 17 of each pair as 360 degrees has to the angle of phase lag produced by shading rings 18 in a manner to be described later.

An electric current flowing in one direction in coil 19 will induce opposite magnetic polarities in the inner and outer rings of poles 16 and 17. A current in the opposite direction will reverse the magnetic polarities of the inner and outer rings. A changing magnetic flux around shading rings 18 will induce opposing circumferential currents in rings 18 that will delay the buildup of magnetization in poles 17. As with any shaded poles, the magnetization of poles 17 will lag behind that of poles 16.

The current in coil 19 will also induce opposite magnetic polarities in the inner and outer edges of element 14. The magnetization will be much stronger in the circumferential sections of element 14 between each pair of inner and outer poles 16 and later between each pair of inner and outer poles 17. This is due to the much lower reluctance path for magnetic flux around coil 19 at these points. A large area of air gap between poles 16 and 17 and element 14 is provided by the bent over portions of poles 16 and 17. The edges of element 14 are tapered over the radial dimension of the air gaps so that the flux density in vertical sections of element 14 will be uniform, or relatively so, across the vertical dimension.

On the first quarter cycle of an alternating electric current flowing in coil 19, magnetization will buildup in poles 16 and in the circumferential sections of element 14 between each pair of inner and outer poles 16. As the current drops to zero during the second quarter cycle, the magnetization of poles 16 will decrease with the current and that of poles 17 will increase due to the induced current in shading rings 18. The circumferential sections of element 14 which were magnetized during the preceding quarter cycle will retain some of their magnetization and be attracted circumferentially to align between the adjacent pairs of inner and outer poles 17. This produces a torque to rotate turntable 11.

On the second electrical half cycle, the magnetization of the inner and outer rings of poles 16 and 17 are reversed. The previously magnetized sections of element 14 are repelled further circumferentially and the action of the preceding half cycle is repeated with new circumferential sections of element 14. When turntable 11 and element 14 reach synchronous speed, the angle of rotation with each electrical cycle will be equal to the angle between circumferentially adjacent poles 16 or poles 17. Alternate circumferential sections of element 14 will be permanently magnetized oppositely and will be subject to only small demagnetizing forces as the set magnetized in one direction will be between circumferentially adjacent pairs of poles 16 when the current in coil 19 is producing an opposing magnetizing force.

The alternately changing flux around coil 19 when it is excited with an alternating current will induce opposing currents in element 14 and stator element 15 that will delay the buildup of magnetization just as it does with shading rings 18. This induced current can be negligibly small by making element 14 and stator element 15 of materials which have a high electrical resistivity. Element 14 and stator element 15 could also be made discontinuous to prevent the circumferential flow of current in them.

Stator element 15 and its projecting poles 16 and 17 can be stamped from a sheet of magnetically non-retentive material. Poles 16 and 17 can then be bent upward and shading rings 18 slipped in place before the ends are bent over. Coil 19 can be separately wound and then dropped in place.

It is possible to provide a large number of poles economically with this type of construction. Increasing the number of poles reduces the synchronous speed. Low speed motors will wear longer, start easier, and reach synchronous speed faster. Reduction gearing can be eliminated for some applications. The space within the inner ring of poles 17 can be used for auxiliary mechanisms and any necessary gearing. Reducing the reluctance of the air gaps will increase the efficiency of a motor. Reducing the length of gap to reduce the reluctance will reduce the mechanical tolerances and so require an exorbitant increase in cost if carried beyond a certain point. Bending over the ends of poles 16 and 17 to increase the effective air gap area is a cheaper means of reducing the reluctance of the air gap.

Figure 4:
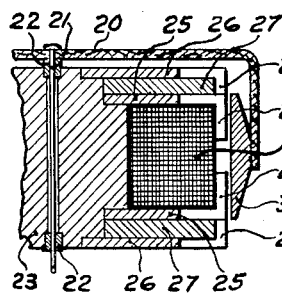
FIG. 4 is an elevation view of a vertical cross section of a portion of the stator and rotor assembly of a second embodiment of the invention.
Figure 5:
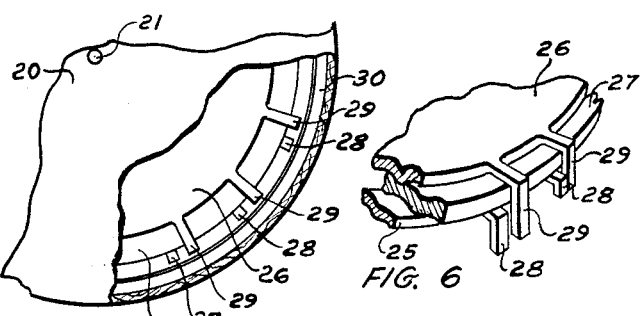
FIG. 5 is a plan view of a fragmentary portion of the second embodiment in which a section of the rotor element support is cutaway.
Figure 6:
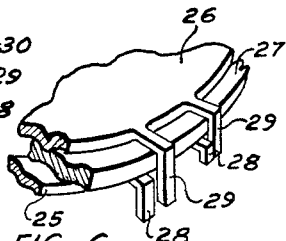
FIG. 6 is a perspective view of a fragmentary portion of the stator poles and annular shading disc of the second embodiment.

FIG. 4, FIG. 5, and FIG. 6 show a second embodiment of the invention whose operation is similar to the one just described but whose structure is different. Cup 20 joins to shaft 21 which journals in bushings 22. Bushings 22 mount in the ends of the hole through core 23 and provide bearing means for rotation of shaft 21 and cup 20.

Toroidally shaped coil 24 fits snugly around core 23. Annular discs 25 are pressed against the shoulders of core 23 adjacent to each side of coil 24. Annular discs 26 likewise engage the shoulders at each end of core 23. Annular shading discs 27 fit between discs 25 and 26.

Poles 28 and 29, projecting from discs 25 and 26 respectively, are bent over coil 24 and are arranged circumferentially like poles 16 and 17 in the first embodiment. Cylindrical shell shaped magnetically retentive element 30 attaches to the inside of cup 20 and has its edges tapered similarly to element 14. Core 23 and discs 25 and 26 are of a magnetically non-retentive material. The flux path around coil 24 is thus similar to the path around coil 19 of the first embodiment and the principles and manner of operation are the same. Core 23, discs 25 and 26, and element 30 should have a high electrical resistivity or be discontinuous to prevent the circumferential flow of excessive induced currents.

Figure 7:
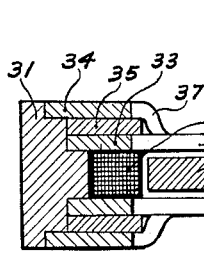
FIG. 7 is an elevation view of a vertical cross section of a portion of the stator and rotor assembly of a third embodiment of the invention.
Figure 9:
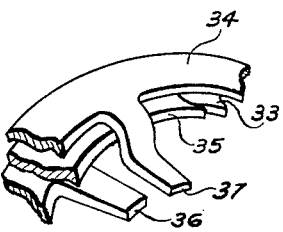
FIG. 9 is a perspective view of a fragmentary portion of the stator poles and annular shading disc of the third embodiment.
Figure 8:
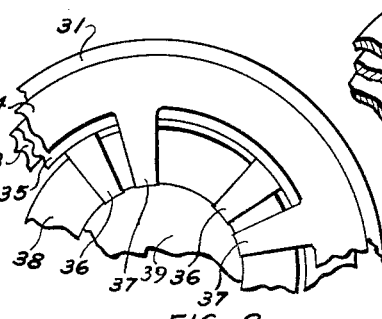
FIG. 8 is a plan view of a fragmentary portion of the third embodiment.

Referring now to FIG. 7, FIG. 8, and FIG. 9, annular core 31 is of a magnetically non-retentive material and has two sets of shoulders formed in its inner side. Toroidally shaped coil 32 fits snugly inside core 31. Annular discs 33 and 34 are also of a magnetically non-retentive magnetic material and fit inside core 31 on the respective sets of shoulders. Annular shading discs 35 fit between each pair of discs 33 and 34. Poles 36 project inwardly toward the annular center from the inner edges of discs 33. Poles 37 extend from the inner edges of discs 34 and have their end portions in the same plane as the ends of poles 36. The circumferential arrangement of poles 36 and 37 is the same as that of poles 16 and 17 and poles 28 and 29 of the first two embodiments.

Magnetically retentive element 38 has a toroidal shape and is supported between the two sets of poles 36 and 37 by disc 39. Disc 39 is rotably supported at the annular center by bearing means (not shown). In this arrangement, the dimension of element 38 in a direction perpendicular to the flux path can be made large to provide a relatively high power motor. As in the first two embodiments, core 31, discs 33 and 34, and element 38 should have a high electrical resistivity or be discontinuous to prevent the circumferential flow of induced currents.

Figure 10:
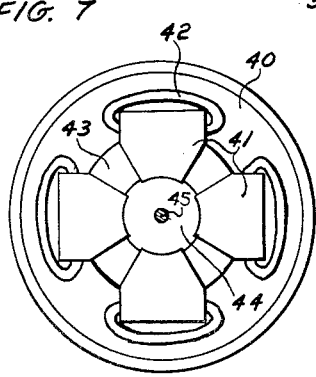
FIG. 10 is an elevation view of a fourth embodiment taken along the drive shaft with one end of the case removed.
Figures 11, 12:
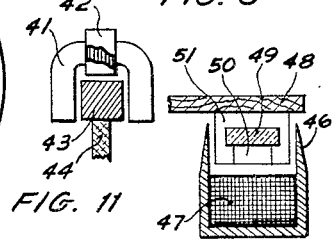
FIG. 11 is an elevation view of one of the stator pole sets and a fragmentary portion of the rotor of the fourth embodiment taken along a direction perpendicular to the axis.
FIG. 12 is an elevation view of a vertical cross section of a fragmentary portion of the stator and rotor assembly of a fifth embodiment.

Referring now to FIG. 10 and FIG. 11, case 40 supports horseshoe elements 41 at equally spaced circumferential positions. Coils 42 are wrapped around the center of elements 41 which are of a magnetically non-retentive material. Toroidally shaped magnetically retentive element 43 mounts on disc 44 and runs between the ends of each element 41. Disc 44 is joined to shaft 45 which journals in bearing means (not shown) which mount on case 40. Mechanical means (not shown) also mounts on case 40 and restricts the rotation of shaft 45 to one direction.

Coils 42 on alternate elements 41 may be connected oppositely to a source of single-phase alternating current. The poles of elements 41 on each side of element 43 at alternate circumferential positions will have opposite magnetic polarities on each electrical half cycle. The section of element 43 magnetized in one direction by a horseshoe element 41 on one half cycle will thus be attracted to the following element 41 on the next half cycle. Element 43 could rotate in either direction but will be restrained to one direction by mechanical means. If desired, sections of elements 41 could be shaded to make the motor self starting and able to run in one direction only.

Coils 42 on the two vertically located elements 41 could be connected oppositely to one phase of alternating current and coils 42 on the two horizontally located elements 41 connected oppositely to a second phase of alternating current. The magnetic field on either side of element 43 would thus rotate as does the magnetic field in a conventional electrical motor with two-phase windings. The flow of flux, however, will be between the ends of each element 41 and the sections of element 43 in a direction perpendicular to the direction of movement. Element 43 will be of a material having a high electrical resistivity.

Figure 13:
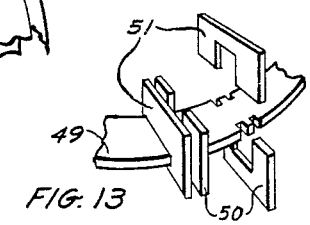
FIG. 13 is a perspective view of a fragmentary portion of the rotor poles and annular shading disc of the fifth embodiment with two of the poles in an exploded position.

Referring now to FIG. 12 and FIG. 13, magnetically retentive element 46 forms an annular trough into which toroidally shaped coil 47 fits. Element 46 has a high electrical resistivity and mounts on a frame (not shown) which also rotatably supports disc 48. Annular shading disc 49 attaches to disc 48 and supports pole pieces 50 and 51. Pole pieces 50 and 51 are pressed in notches in disc 49 and are arranged circumferentially as are poles 16 and 17 and poles 28 and 29 of the first two embodiments. Pieces 50 and 51 may be stamped out of sheets of a magnetically non-retentive material and so be made as thin as desired. A large number of pieces 50 and 51 can thus be used in a motor having a relatively small circumference.

The edges of element 46 are tapered over the portions adjacent to the edges of pieces 50 and 51 to maintain a uniform flux density in element 46. The flux path around coil 47 is similar to that around coil 19 in the first embodiment except that a major portion of the path is in the magnetically retentive material and a lesser portion in the magnetically non-retentive material. The manner of operation is the same as that of the first embodiment.

This type of structure makes it practical to provide a large number of poles for very low speeds. Element 46 can be pre-magnetized to make effective use of the longer path in the magnetically retentive element. The magnetizing force produced by current in coil 47 should approximately balance that of the pre-magnetized element 46. The rotor should be capable of reaching synchronous speed on the first electrical cycle because of the low accelerating force required to attain the slow speed. There will be fewer losses in the magnetically non-retentive material which has to change its direction of magnetization with each electrical half cycle as it forms a smaller portion of the path and so will be smaller in volume for the flux handled.

As the invention applies the magnetizing forces in a direction substantially perpendicular to the direction of relative movement between the magnetically retentive and non-retentive elements, it is always possible to adjust the dimensions so that the reluctance of the path in the magnetically retentive material matches that of the air gaps for best results. This can be done when using a variety of magnetically retentive materials and a variety of circumferential configurations. The only limitation on reducing the circumferential size and spacing of poles is the increased leakage between shaded and unshaded poles. The configurations of the first three embodiments minimize this type of leakage. While high power motors will normally be more efficient due to the increased air gap area, a substantial increase in efficiency in low power motors is provided by the bent over poles and tapered edes of the magnetically retentive elements.

The embodiments shown and described are not to be considered inclusive but are merely illustrative of some of the ways in which the invention can be used. Various other arrangements and modifications can be made without departing from the spirit and scope of the invention which is defined in the appended claims.

What is claimed is:

1. An electric motor of the self starting single phase hysteresis type comprising an annular hysteresis element which is substantially non-conductive around its circumference and which has one cross sectional dimension substantially larger than the other, a plurality of magnetically non-retentive poles each having its ends adjacent to opposite edges of the largest cross sectional dimension of said element at the same circumferential location, said poles being grouped in pairs equally spaced about the circumference of said element with the space between pairs being greater than the space occupied by a pair, annular windings running substantially coextensive with said element between said element and said poles and connectable to a single phase alternating voltage, means for supporting said element for rotation about its axis with respect to said poles and said windings, means for shading one of the said poles of each pair.

2. The combination according to claim 1 wherein said poles have their ends bent over to run parallel with said element.

3. The combination according to claim 2 wherein said element is tapered over the sections adjacent to said poles.

4. The combination according to claim 1 wherein said element is in the form of an annular disc, said shading means comprises two conductive rings of different diameters concentric with inner and outer sections of said element, one pole of each pair being bent around said annular windings between said conductive rings and having its ends bent radially inward and outward respectively over said inner and outer rings, and the other pole of each pair being bent around said annular windings and said conductive rings and having ends bent radially outward and inward respectively over said inner and outer rings.

5. The combination according to claim 4 wherein said poles are formed of projections from the inner and outer edges of a magnetically non-retentive annular disc member.

6. The combination according to claim 1 wherein said element is in the form of a ring, said shading means comprises two conductive annular discs respectively located on opposite sides of said annular windings, one pole of each pair providing a magnetic path through said element around said annular winding and between said conductive annular discs, and the other pole of each pair providing a magnetic path through said element around both said conductive annular discs and said annular windings.

7. The combination according to claim 6 wherein said poles are formed as projections from a common magnetic structure.

8. The combination according to claim 7 wherein said annular windings, said annular discs, and said magnetic structure are greater in diameter than said element and are mounted concentrically around the outer circumference of said element.

9. The combination according to claim 7 wherein said annular windings, said annular discs, and said magnetic structure are smaller in diameter than said element and are mounted concentrically within the inner circumference of said element.

References Cited in the file of this patent

UNITED STATES PATENTS

| Number | Name | Date |
|---|---|---|
| 1,995,726 | Warren | Mar. 26, 1935 |
| 2,070,447 | Morrill | Feb. 9, 1937 |
| 2,304,688 | Hansen et al. | Dec. 8, 1942 |
| 2,421,301 | Swisher | May 27, 1947 |
| 2,543,816 | Walworth | Mar. 6, 1951 |
| 2,572,632 | Kurz | Oct. 23, 1951 |
| 2,665,389 | Landgraff et al. | Jan. 5, 1954 |

FOREIGN PATENTS

| Number | Country | Date |
|---|---|---|
| 389,158 | Great Britain | Mar. 16, 1933 |
| 400,435 | Great Britain | Oct. 26, 1933 |
| 493,928 | Great Britain | Jan. 1, 1937 |
| 551,177 | Germany | May 28, 1938 |